Figure 1:
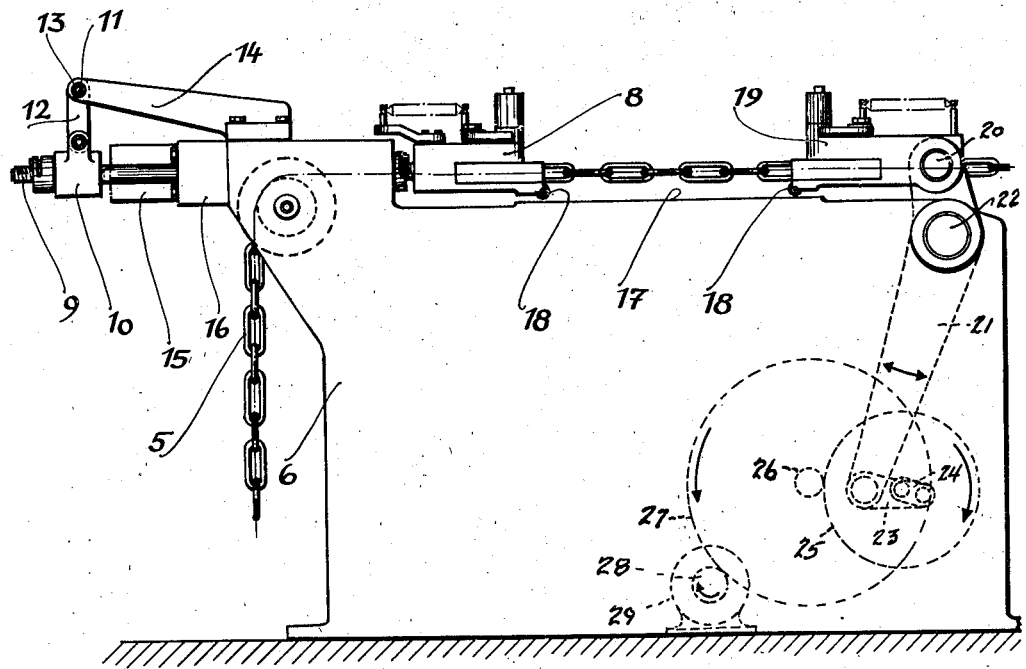

Feb. 25, 1958 H. STÜTZER 2,824,446
APPARATUS FOR TESTING THE TENSILE
STRENGTH OF CHAINS AND THE LIKE
Filed Oct. 1, 1953 2 Sheets-Sheet 1

Inventor
H. Stutzer
By: Glascock Downing & Seebold
Attys.

Feb. 25, 1958   H. STÜTZER   2,824,446
APPARATUS FOR TESTING THE TENSILE
STRENGTH OF CHAINS AND THE LIKE
Filed Oct. 1, 1953   2 Sheets-Sheet 2

Inventor
H. Stutzer
By: Hancock Downing xSeabold
Attys.

United States Patent Office 2,824,446
Patented Feb. 25, 1958

2,824,446

APPARATUS FOR TESTING THE TENSILE STRENGTH OF CHAINS AND THE LIKE

Hans Stützer, Koln-Bickendorf, Germany

Application October 1, 1953, Serial No. 383,630

Claims priority, application Germany October 13, 1952

1 Claim. (Cl. 73—95)

Chains and similar products, when they have to meet exacting requirements, must be continually tested as regards their tensile strength and elongation. For carrying out these tests apparatus is needed which, contrary to the apparatus intended solely for use in the laboratory, must be capable of carrying out such tests automatically in large numbers and in a very short time. As a consequence chain testing machines have been developed, in which the chain to be tested is laid in front of the machine with its end passing vertically upwards over a roller and then horizontally, the horizontal portion being the actual test length. The chain is then passed over another roller and downwards on to the floor where it rests. The test length and the machine are so dimensioned that there is ample space on the floor under the machine both for the portion of the chain which has not been tested and that which has been tested. This arrangement necessitates the horizontal guiding of the chain during the test and has proved so satisfactory that vertical testing is practically never carried out.

The objection to these chain testing machines wherein the test length extends in a horizontal plane, is that the tensile force also acts in horizontal direction, so that the grips for the test length must be also horizontal. One of the grips is connected to a measuring device—for example an electric pressure cell—and to registering instrument for recording the measurements, whereas the other grip is connected with a lever transmission or the like and subjects the test piece to the prescribed stress, the corresponding load being measured in the prescribed manner by the pressure cell. During this operation the grips may move, the gripper connected to the pressure cell moving very little and the gripper supplying the force moving much farther. As the grips operate in a horizontal plane, these movements must be supported in the vertical direction, this being usually effected by rollers mounted on the grips and movable along a track.

According to existing regulations for testing chains, a measurement accuracy of ±1% is required with about 20 to 30 measurements per minute. This is frequently no longer possible with the existing apparatus because the measuring results are influenced by the sliding friction of the grips of the track and are dependent upon the condition of the machine, for example the state of the track and rollers. But the requirements placed on measuring accuracy must become still more exacting as development progresses, because it is necessary to use harder chains to an ever increasing extent and even a slight deviation in tensile strength in these may have very serious consequences.

The object of the invention is to overcome this objection as regards lack of measuring accuracy. To attain this the track is arranged at a level which is lower than the positions the grips occupy during the testing operation.

The result of this arrangement is that the grips and their rollers lift automatically off the track so that the source of error is entirely eliminated during the measuring operation. In this manner an accuracy in measurement is obtained which is only about half the prescribed tolerance for maximum permissible accuracy of measurement.

Figure 1A:
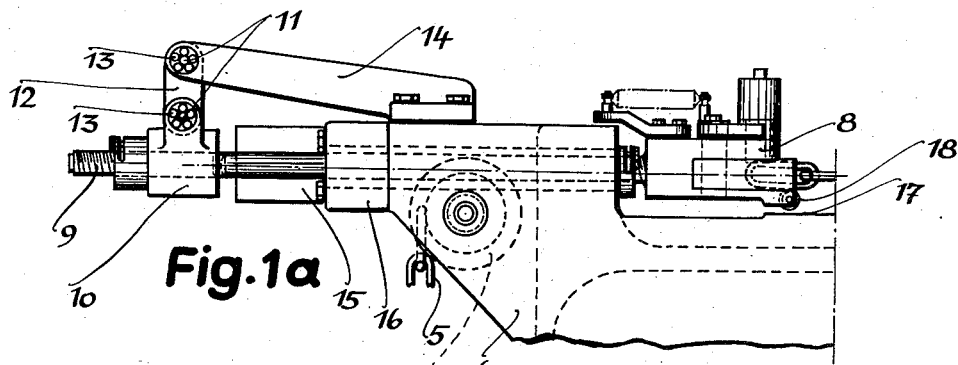
Figure 1B:
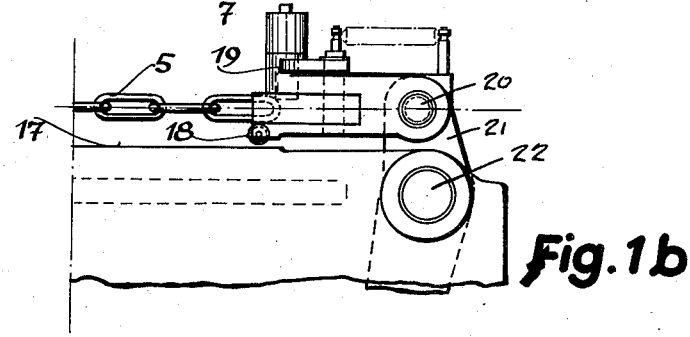
Figure 2A:
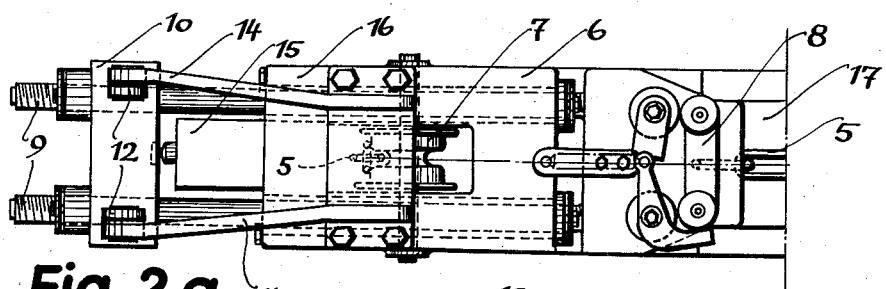
Figure 2B:
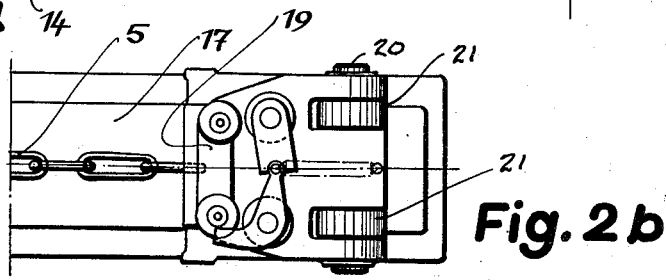

One form of the invention is illustrated in the accompanying drawing, in which:

Fig. 1 shows a general elevation of a testing machine incorporating the present invention;
Fig. 1a is an enlarged elevation of the left hand end of the machine as shown in Fig. 1;
Fig. 1b is an enlarged elevation of the right hand end of the machine as shown in Fig. 1;
Fig. 2a is a plan view of the portion of the machine shown in Fig. 1a; and
Fig. 2b is a plan view of the portion of the machine shown in Fig. 1b.

The chain 5 extends over a roller 7 mounted in the machine frame 6 and is attached to a grip 8 which is connected by two spindles 9 to a freely movable yoke 10, which in turn is linked to two carrier arms 14 by two intermediate levers 12 articulated on pivot pins 11 each carrying a ball-bearing 13. During the testing operation the yoke transmits the stress to a pressure cell 15 which in turn is mounted on a traverse 16 fixed on the machine frame 6. This traverse 16 is located at one extreme end of the machine above the plane of the track 17 and is designed to transmit the stress placed on the chain under test to the frame of the machine. The spindles 9 pass through large apertures so that the spindles 9 do not touch the traverse 16 at any time. The grip 8 is guided by a roller 18 running on a track 17.

The chain then passes across the test gap between the grip 8 and a second grip 19 serving to exert the tension. This second grip 19 is also guided by rollers 18 running on the same track 17 as the roller of the grip 8, and in addition is connected by pin 20 to an arrangement for stretching the chain, which arrangement comprises a pair of levers 21 oscillated about a fixed pivot 22 by means of a link 23 connecting the lever 21 to crank 24. Crank 24 is rotated by gear train 25, 26, 27, 28 driven by motor 29, as seen in dotted lines in Fig. 1. The chain then passes over a roller, also not shown in the drawing but which corresponds to the roller 7, and is deposited in downward direction.

According to the invention, the track 17 is arranged so low down in the frame that the rollers 18 lift from the track during the testing operation. In other words, when the chain is not under stress, the grips 8 and 19 drop down onto the track, whereas when a stress is applied to the chain the entire assemblage assumes a straight line from yoke 10 which is supported by arms 14 and which supports spindles 9 carrying grip 8 to pin 20 which pulls grip 19. It will be seen, then, that the rollers 18 will lift off the tracks as the chain is put under stress so that there will be no frictional drag of the support for the grips to introduce errors into the load measurement registered by pressure cell 15.

The apparatus can be used in a similar manner for other purposes, for example for testing other products. The chains may also be subjected to a prescribed load instead of to the prescribed elongation by the grip transmitting the force.

I claim:

In a testing machine, a horizontal bed, a traverse at one end of said bed to resist the testing stress applied by the machine, a first horizontally movable grip adjacent said traverse to hold one end of the material under test, a yoke on the side of the traverse remote from said grip and rigidly connected to said grip, said first grip and yoke being pivotable on a horizontal axis remote from said grip, a second horizontally movable grip spaced from said first grip and located at the end of said testing machine remote from said first grip, said second grip being pivotally mounted on a lever which is oscillated by a motor, a pressure cell between the said traverse and said yoke to record the stress in the test piece, and a track-way to support said grips, said track-way being sufficiently below the said grips that the grips may rest on said track-way when the test piece is not under stress and lift off of the track-way when the test piece is placed under stress.

References Cited in the file of this patent

UNITED STATES PATENTS

| | | |
|---|---|---|
| 1,219,594 | Scott | Mar. 20, 1917 |
| 2,431,173 | Hawkes | Nov. 18, 1947 |
| 2,453,576 | Jacob | Nov. 9, 1948 |

FOREIGN PATENTS

| | | |
|---|---|---|
| 26,480 | Great Britain | 1911 |